US012715624B2

(12) United States Patent
Boucard et al.

(10) Patent No.: US 12,715,624 B2
(45) Date of Patent: Aug. 25, 2026

(54) MODULAR SYSTEM FOR DRONES

(71) Applicant: Tesseract Ventures, LLC, Overland Park, KS (US)

(72) Inventors: John Boucard, Kansas City, MO (US); Jason Harrell, Tampa, FL (US); Greg Lorett, Kansas City, MO (US); Josh Holloway, Overland Park, MO (US); Griffin Garbutt, Overland Park, MO (US)

(73) Assignee: Tesseract Ventures, LLC, Lenexa, KS (US)

( * ) Notice: Subject to any disclaimer, the term of this patent is extended or adjusted under 35 U.S.C. 154(b) by 0 days.

(21) Appl. No.: 19/053,070

(22) Filed: Feb. 13, 2025

(65) Prior Publication Data

US 2025/0256868 A1 Aug. 14, 2025

Related U.S. Application Data

(63) Continuation-in-part of application No. 29/989,553, filed on Feb. 13, 2025, and a continuation-in-part of application No. 29/989,554, filed on Feb. 13, 2025, and a continuation-in-part of application No. 29/989,555, filed on Feb. 13, 2025, and a continuation-in-part of application No. 29/989,556, filed on Feb. 13, 2025, and a continuation-in-part of application No. 29/989,551, filed on Feb. 13, 2025.

(60) Provisional application No. 63/711,481, filed on Oct. 24, 2024, provisional application No. 63/552,911, filed on Feb. 13, 2024.

(51) Int. Cl.

| | |
|---|---|
| ***B64U 20/40*** | (2023.01) |
| ***B64U 20/87*** | (2023.01) |
| *B64U 101/18* | (2023.01) |
| *B64U 101/30* | (2023.01) |

(52) U.S. Cl.
CPC ............. *B64U 20/40* (2023.01); *B64U 20/87* (2023.01); *B64U 2101/18* (2023.01); *B64U 2101/30* (2023.01)

(58) Field of Classification Search
CPC .... B64U 20/40; B64U 20/87; B64U 2101/30; B64U 2101/18
See application file for complete search history.

(56) References Cited

U.S. PATENT DOCUMENTS

| | | | | |
|---|---|---|---|---|
| 9,957,045 | B1 * | 5/2018 | Daly | B64U 50/19 |
| 2005/0204910 | A1 * | 9/2005 | Padan | B64D 1/04 89/1.813 |
| 2010/0140406 | A1 * | 6/2010 | Walton | B64D 1/06 244/129.5 |
| 2010/0258672 | A1 * | 10/2010 | Grabmeier | B64D 1/04 244/118.2 |
| 2016/0288906 | A1 * | 10/2016 | Christof | B64D 1/04 |
| 2020/0140087 | A1 * | 5/2020 | Fulbright | A62C 3/0235 |
| 2024/0067371 | A1 * | 2/2024 | Turner | B64U 50/37 |

* cited by examiner

*Primary Examiner* — Tye William Abell
(74) *Attorney, Agent, or Firm* — Polsinelli PC

(57) ABSTRACT

A modular system for drones is provided. A chassis can include a coupling mechanism operable to removably couple the chassis with a drone. A plurality of modular components can be operable to be interchangeably coupled with a control component. The modular components can be operable to be detachably coupled with a payload.

17 Claims, 15 Drawing Sheets

MODULAR SYSTEM FOR DRONES

CROSS-REFERENCE TO RELATED APPLICATIONS

This application is a continuation-in-part application of (1) U.S. Design patent application Ser. No. 29/989,551, filed on Feb. 13, 2025, (2) U.S. Design patent application Ser. No. 29/989,553, filed on Feb. 13, 2025, (3) U.S. Design patent application Ser. No. 29/989,554, filed on Feb. 13, 2025, (4) U.S. Design patent application Ser. No. 29/989,555, filed on Feb. 13, 2025, and (5) U.S. Design patent application Ser. No. 29/989,556, filed on Feb. 13, 2025, and claims the benefit of (1) U.S. Provisional Patent Application No. 63/552,911, filed on Feb. 13, 2024, (2) U.S. Provisional Patent Application No. 63/711,481, filed on Oct. 24, 2024, each of which is incorporated herein by reference in its entirety for all purposes.

FIELD

The present disclosure is directed to a modular system operable to couple with drones and provide a plurality of different configurations and capabilities.

BACKGROUND

Drones have seen rapid technological advancement and widespread adoption across various industries, including agriculture, filmmaking, and delivery services. Drones have also revolutionized modern warfare with their versatility and capabilities.

Drones can be equipped with various sensors, cameras, and sometimes weapons, allowing them to perform reconnaissance, surveillance, and combat tasks without risking human lives. Drones have evolved to include more capabilities, for example being integral for modern military operations as drones can offer real-time data collection and precision strikes against enemy targets. However, conventional drones have fixed capabilities.

BRIEF DESCRIPTION OF THE DRAWINGS

Implementations of the present technology will now be described, by way of example only, with reference to the attached figures.

DESCRIPTION

Figure 1A:
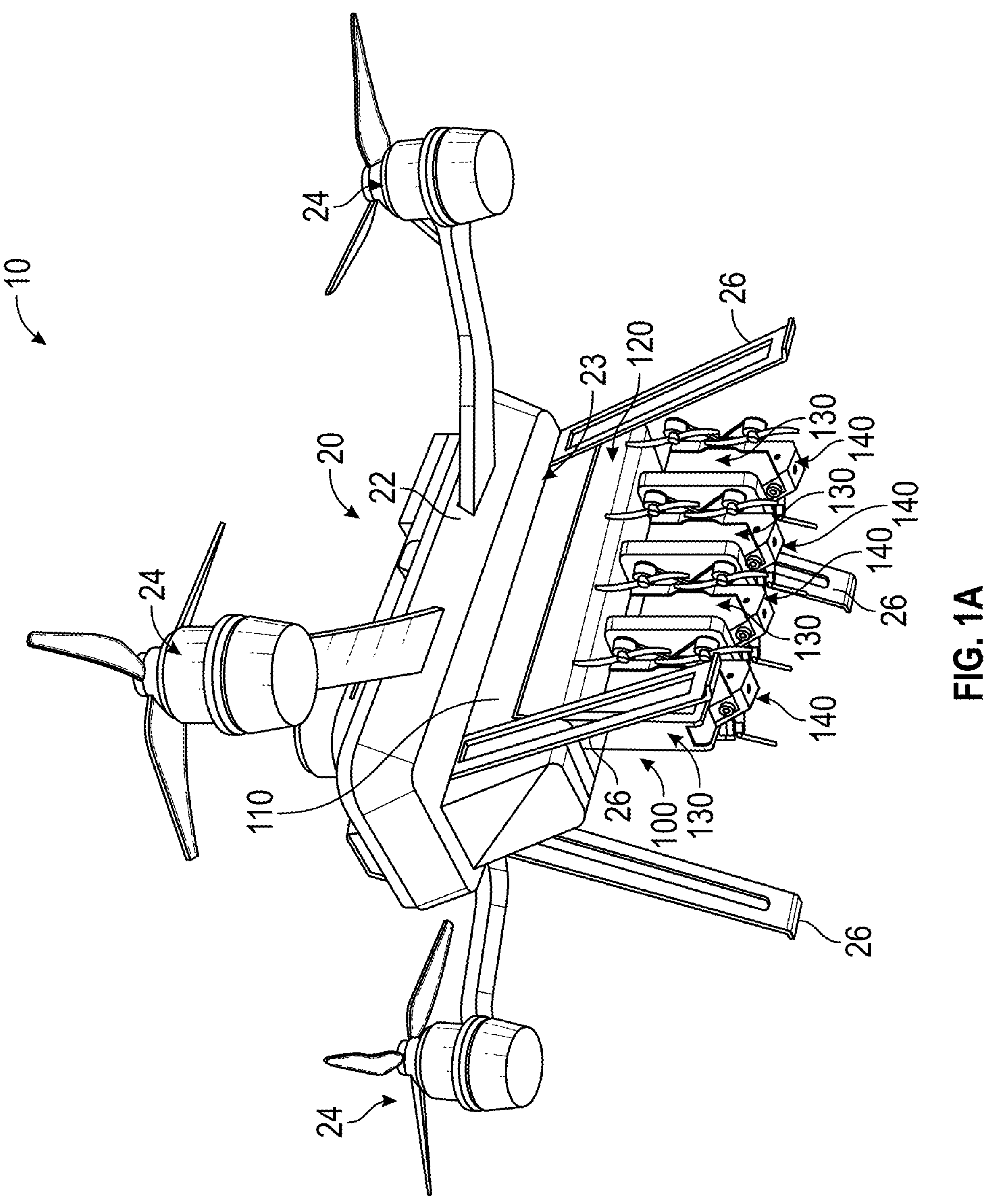
FIG. 1A illustrates a perspective view of a drone system including a drone coupled with a modular system, according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "about" means reasonably close to the particular value. For example, about does not require the exact measurement specified and can be reasonably close. As used herein, the word "about" can include the exact number. The term "near" as used herein is within a short distance from the particular mentioned object. The term "near" can include abutting as well as relatively small distance beyond abutting. The terms "comprising," "including" and "having" are used interchangeably in this disclosure. The terms "comprising," "including" and "having" mean to include, but not necessarily be limited to the things so described.

The presently disclosed modular system is operable to couple with any drone, for example a conventional drone, and provide a plurality of interchangeable modular components that can receive and/or deploy any of a plurality of payloads. The modular system include a chassis that can be removably coupled with a drone. In some examples, the chassis can be coupled with the drone such that no modifications to the drone is needed. Accordingly, the modular system can be retrofit to any conventional drone and provide additional capabilities to the conventional drone.

The modular components (e.g., connected modules) can be interchangeably coupled with a control component. Each of the modular components can receive and/or deploy corresponding payloads, which can have different functionalities, for example drone, explosives, ballistics, radio repeater, antenna, camera, light emittance, audio recording, audio playback, computing, wireless communication, data relay, seismic monitoring, and/or sensors. By being able to add and/or remove modular components and payloads, the capabilities of the drone via the modular system are increased. Additionally, the modular components and payloads can be easily removably coupled with the control component so that the drone can be fitted with the desired capabilities and functionalities quickly and effortlessly. For example, in a military operation, the operator may need to quickly change the modular components and/or payloads for a particular mission. The modular system allows the operator to easily switch around the functionalities of the drone to fit the desired purpose in the field. The modular system allows the operator to have a variety of functional options available at hand without the need of multiple drones.

In some examples, the control component can be included in the modular system. The control component can be operable to transmit power, signals, and/or data to other components of the modular system. The control component can include a battery that can provide additional power for the drone and/or the modular system.

In at least one example, the modular component can include an actuator that can allow for deployment of the one or more payloads. The payloads can include, without being limiting, explosive charges, direct ballistics, drones, light emitters, speakers, antennae, radios, and/or sensors. For example, the drone can be controlled to fly to a destination. When the drone reaches the destination, the actuator can be triggered to release a payload at that destination. In some examples, a plurality of payloads can be operable to communicate and/or work in a coordinated fashion to perform a desired function.

In at least one example, the modular system can include a controller (e.g., handheld controller, remote controller, phone, tablet, computer, laptop, etc.) that can be operable to transmit instructions to the control component, the modular components, the payloads, and/or the drone. In some examples, the controller can also receive information from the control component, the modular components, the payloads, and/or the drone. The controller can be utilized to control and/or coordinate the different components of the modular system and/or the drone. In some examples, the controller can be worn on the wrist of the operator. In some examples, the controller can be a computer, laptop, tablet, etc. In some examples, the controller can be included in a portable device. The control panel can be touch screen, gesture controlled, mouse controlled, or any other suitable mechanism of control. The controller can allow the operator in the field to control the components of the modular system for the operation.

In some examples, a lead controller can be communicatively coupled with the components of the modular system and/or the controller. The lead controller can be positioned in a headquarters or a base control. The lead controller can receive the information from the drone, the controller, and/or the modular system and coordinate the operation accordingly. The lead controller can be operable to provide communication between the lead controller and the controller such that the lead operator can communicate with the operator in the field. In some examples, there may be multiple operators in the field with a plurality of drones with modular systems, and the lead operator can coordinate the actions for each of the operators and/or the drones and/or the modular systems.

Figure 1B:
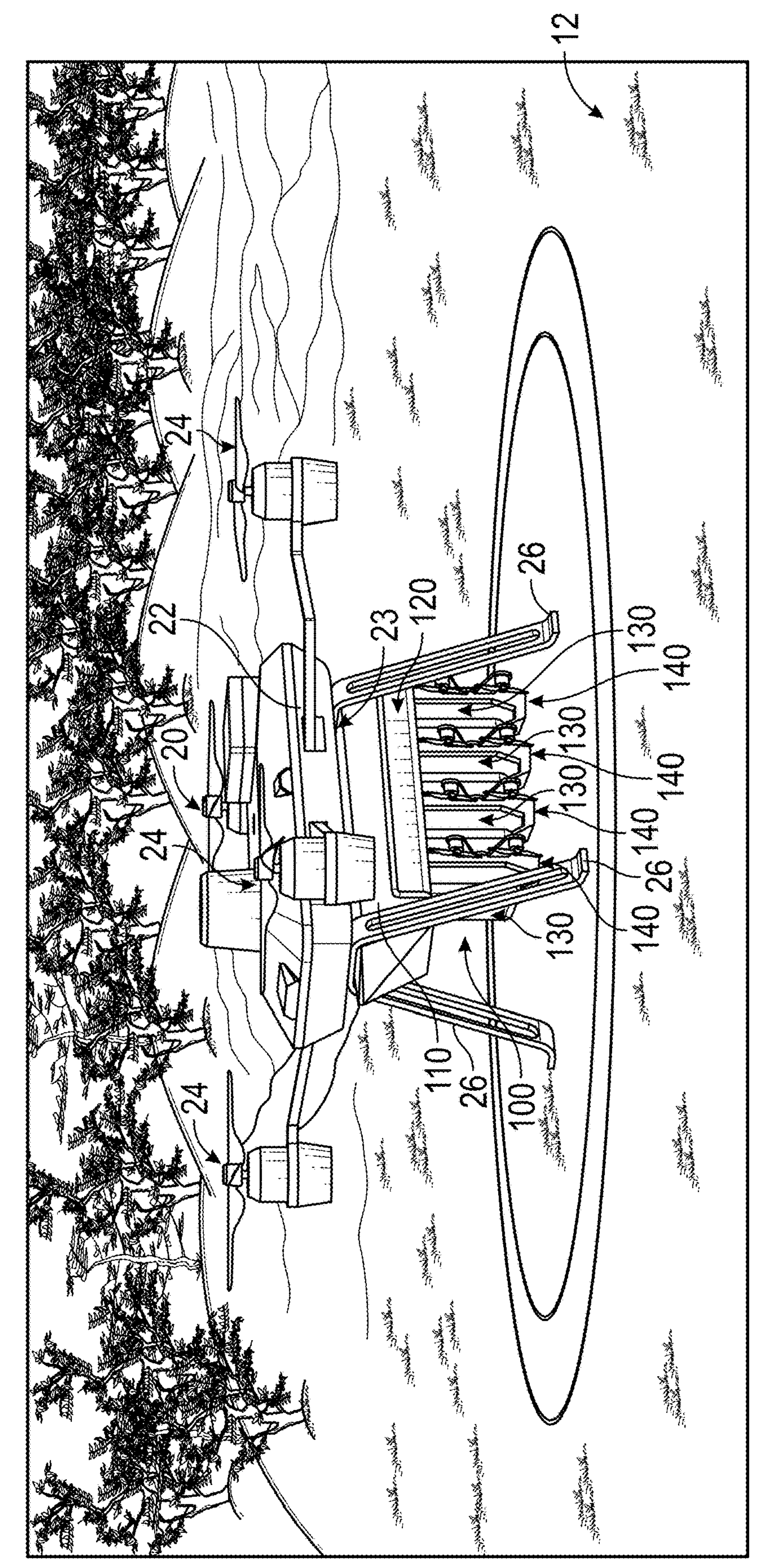
FIG. 1B illustrates the drone system landing on a surface.

The disclosure now turns to FIGS. 1A and 1B, which illustrates an example of a drone system 10. The drone system 10 can include a drone 20. The drone 20 can be an unmanned aerial vehicle that can fly autonomously and/or be controlled remotely by a user. The drone 20 can include a body 22 and one or more propellers 24 coupled with the body 22. The propellers 24 can be operable to generate thrust, allowing the drone 20 to lift off, maintain stability, and/or maneuver in different directions. The drone 20 can provide any of a plurality of functions and corresponding components. For example, the drone 20 can include a camera to capture images and/or videos, which can include thermal imaging, night vision, and/or infrared imaging. In some examples, the drone 20 can be any conventional drone.

A modular system 100 can be coupled with the drone 20 to provide additional capabilities to the drone 20. The modular system 100 can be highly modular and easily configured for rapid deployment to provide flexibility in equipping drones with the right components and functions for the task at hand. The modular system 100 can provide mechanical, electrical, and/or software interfaces allowing connection, control, and/or deployment of payloads 140, agnostic of the drone 20. For example, FIG. 1B illustrates the drone system 10 landing on a surface 12 at a predetermined location to deploy the payloads 140. As shown in FIG. 1B, the modular system 100 can include a plurality of legs 26 which can be operable to make contact with the landing surface to stabilize the drone system 10 upon landing. In some examples, the legs 26 can extend from the chassis 110. In some examples, the legs 26 can extend from the control component 120.

The modular system 100 can include a chassis 110, a control component 120, and a plurality of modular components 130.

Figure 2A:
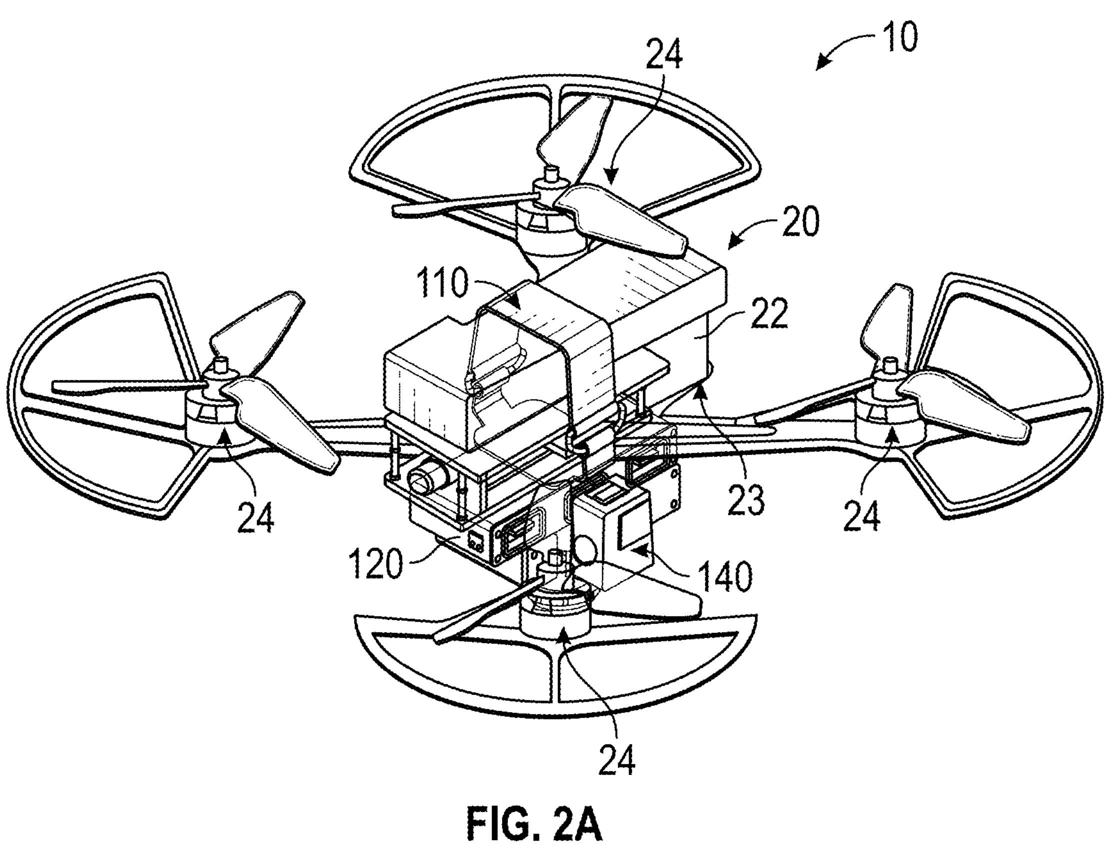
FIG. 2A illustrates a drone system with a modular system coupled with the drone via a chassis.
Figure 2B:
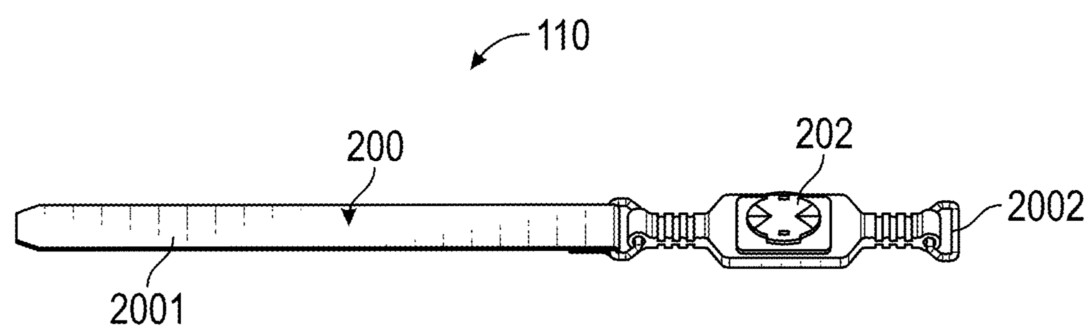
FIG. 2B illustrates an example chassis.

In at least one example, the chassis 110 can be operable to removably couple with the drone 20. In some examples, the chassis 110 can be retrofit to be coupled with the drone 20 (e.g., a conventional drone), without modification needed to the drone 20. In such examples, the modular system 100 can be operable to be coupled with and provide the additional capabilities to any drone 20, so long as the drone 20 has the capability of carrying the weight of the modular system 100. For example, as shown in FIGS. 1A and 1B, the chassis 110 can be operable to be coupled with an underside 23 of the body 22 of the drone 20. The chassis 110 can couple with the drone 20 via latch mechanism, snap-fit connectors, magnets, clasps, quick-release pins, buckles, clips, etc. without deviating from the scope of the disclosure, so long as the chassis 110 is detachably coupled with the drone 20 and does not separate undesirably during the operation. In some examples, as shown in FIGS. 2A-2B, the chassis 110 can include a coupling mechanism 200 operable to removably couple the chassis 110 with the drone 20. In some examples, the coupling mechanism 200 can include a flexible strap 2001 operable to be wrapped about the body 22 of the drone 20. The flexible strap 2001 can be fastened with a closure mechanism 2002 such as a buckle, hook and loop, snap, sliding adjuster, etc. to ensure a tight and adjustable connection that can be released when needed. As shown in FIG. 2B, the chassis 110 can include an interface 202 which can be detachably coupled with the control component 120.

In at least one example, the control component 120 can be coupled with the chassis 110. In some examples, the control component 120 can include the chassis 110. In some examples, the chassis 110 can include the control component 120. In some examples, the control component 120 can be detachably coupled with the chassis 110 such that different chassis 110 can be installed depending on the type of drone 20 and/or the type of control component 120. In some examples, the control component 120 can be detachably coupled with the chassis 110 such that the control component 120 can be replaced if needed, for example if the control component 120 is damaged and/or malfunctioning. Accordingly, the control component 120 and the chassis 110 provide modularity to the modular system 100, as the control component 120 and/or the chassis 110 can be interchanged as needed.

Figure 3:
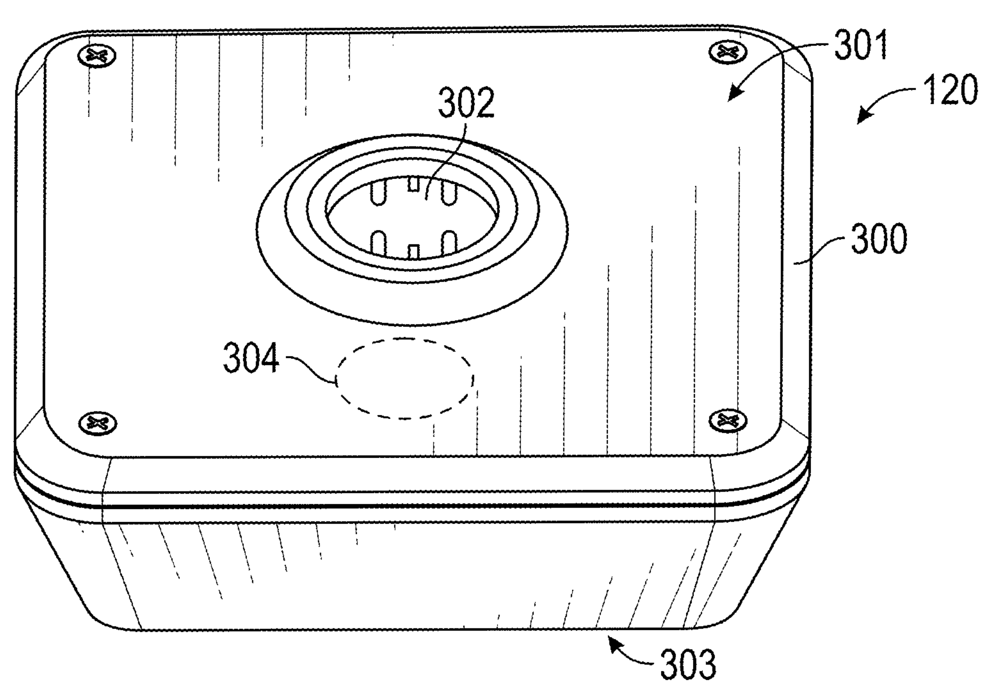
FIG. 3 illustrates a control component.
Figure 16:
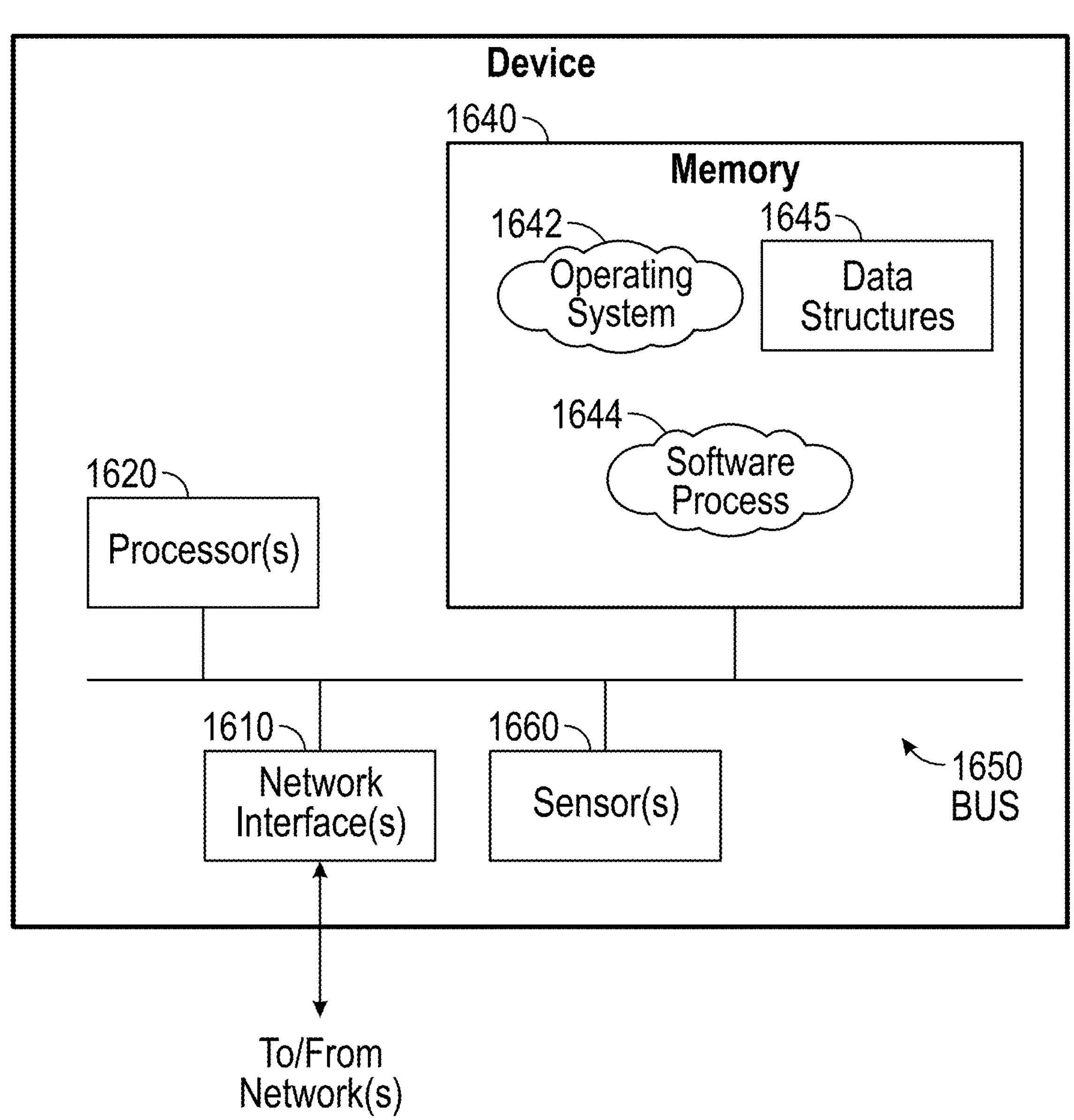
FIG. 16 is a schematic diagram of a processor which may be employed as shown in FIGS. 1A-15.

The control component 120 can be operable to provide connectivity, power, and/or control of each of the plurality of modular components 130. For example, the control component 120 can send a signal to the modular component 130 to cause the modular component 130 to deploy and/or control the payload 140. In at least one example, the control component 120 can include a processor 1600, for example as illustrated in FIG. 16, to control the modular components 130. FIG. 3 illustrates an example of a control component 120. The control component 120 can include a body 300 that has a first side 301 and a second side 303. In some examples, the first side 301 can be proximate the chassis 110 and/or the drone 20 when the control component 120 is coupled with the drone 20. In some examples, the second side 303 can be opposite the first side 301 such that the second side 303 is positioned away from the chassis 110 and/or the drone 20 when the control component 120 is coupled with the drone 20. In some examples, the control component 120 can include a first interface 302 that is operable to detachably couple with the chassis 110. In some examples, the control component 120 can include a second interface 304 that is operable to detachably couple with a modular component 130.

In at least one example, the modular components 130 can be detachably coupled with the control component 120 such that the modular components 130 can be interchanged depending on the function needed, when the modular component 130 needs replacement (e.g., malfunctioning), etc. Accordingly, the modular components 130 can be interchangeably coupled with the control component 120 to provide a variety of functions and capabilities to the modular system 100 and the drone system 10. The modular components 130 can be coupled with the control component 120 while providing an electrical connection such that the control component 120 can cause the modular components 130 to function as desired (e.g., deploy and/or control the payload 140).

In at least one example, the modular components 130 can be operable to be detachably coupled with a payload 140. Accordingly, the modular component 130 can be operable to receive the payload 140 during transport as the drone 20 moves. In some examples, the modular component 130 can be operable to deploy the payload 140 when the drone 20 arrives to the predetermined location. In some examples, the modular component 130 can cause the payload 140 to function to provide a desired result, such as emit a sound, emit light, etc.

In some examples, the modular component 130 can include an actuator 402 operable to receive and control (e.g., adjust, control function, deploy, etc.) the payload 140. Each of the actuators 402 can include one or more receiving portions 404 operable to detachably couple with the payload 140. For example, the receiving portions 404 can include one or more of the following to couple with the payload 140: latch mechanism, snap-fit connectors, magnets, clasps, quick-release pins, buckles, clips, etc. The receiving portions 404 can be operable to transition between a connection configuration and a deploy configuration. The connection configuration can maintain the coupling of the payload 140 with the actuator 402. The deploy configuration can include adjusting the receiving portion 404 (e.g., move a latch, move a bar, open a ring, etc.) so that the payload 140 can be detached from the modular component 130 and deployed. In at least one example, when the actuator 402 of the modular component 130 deploys the payload 140, the actuator 402 can be operable to transmit a control signal to the payload 140 to cause the payload 140 to detach from the actuator 140. In some examples, the receiving portion 404 can provide electrical connections such that signals, power, etc. can be passed from the modular component 130 to the payload 140.

In at least one example, the modular component 130 can include an interface 400 that is operable to detachably couple with the control component 120 (e.g., the second interface 304, as illustrated in FIG. 3). The interface 400 can be operable to transmit power and/or signals when coupled with the control component 120.

Figure 4:
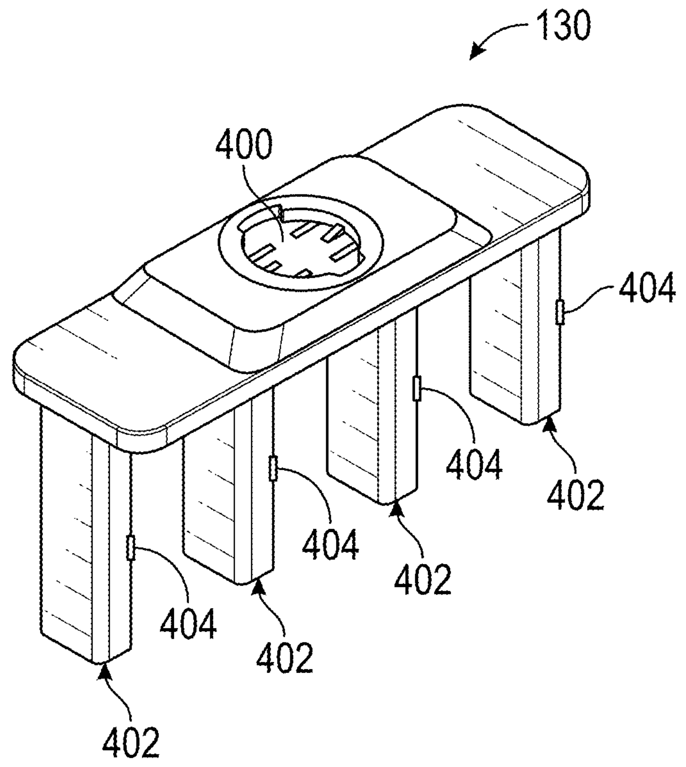
FIG. 4 illustrates a modular component operable to deploy one or more payloads, such as drone payloads.

In at least one example, as illustrated in FIG. 4, a modular component 130 can include a plurality of actuators 402. The actuators 402 can extend vertically downward from a base of the modular component 130. With such a configuration, the actuator 402 can be operable to restrict horizontal movement of the payload 140 received therein such that the payload 140 deploys vertically downward.

Figure 5:
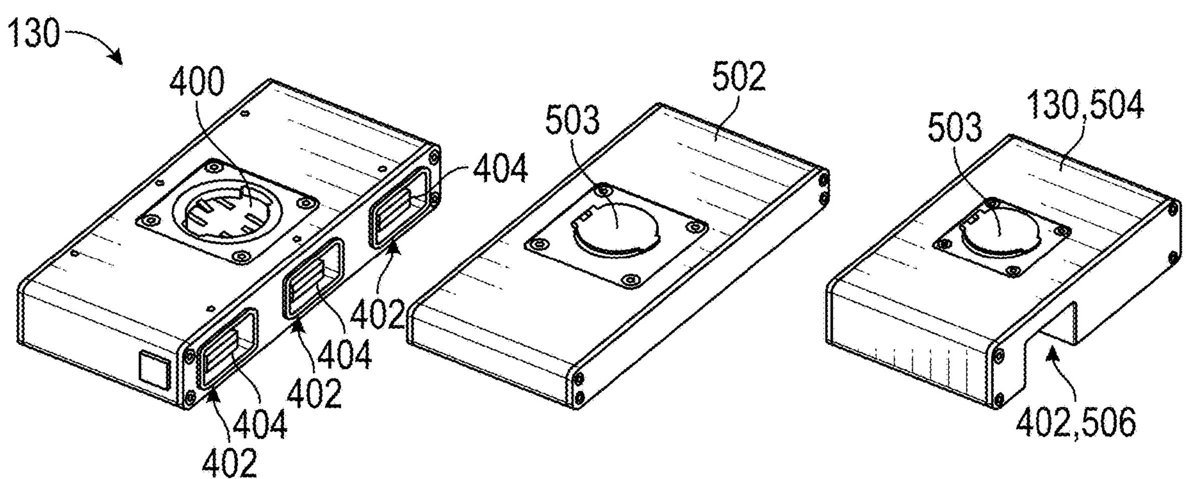
FIG. 5 illustrates example modular components.
Figure 8:
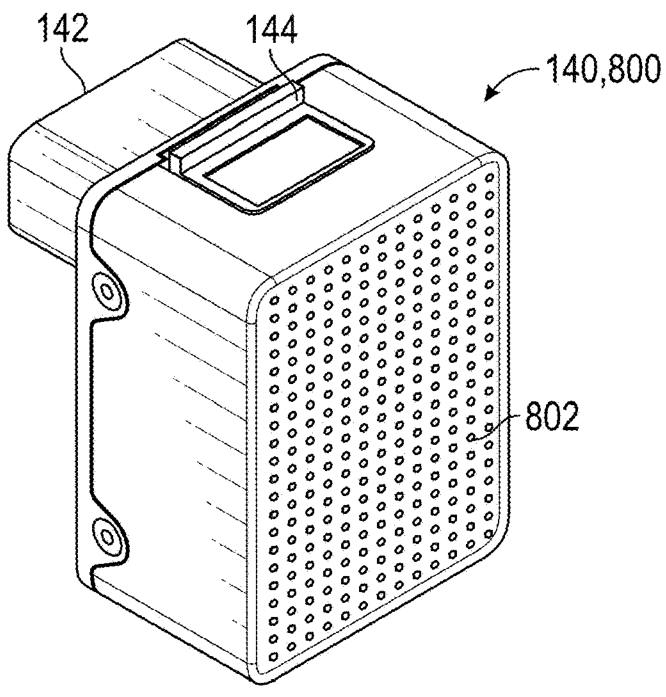
FIG. 8 illustrates a light emitter payload.
Figure 9:
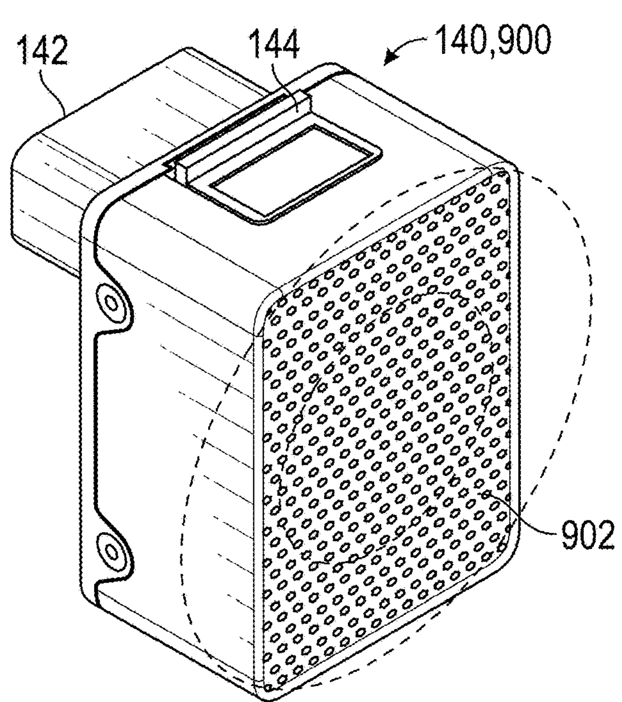
FIG. 9 illustrates an audio payload.
Figure 10:
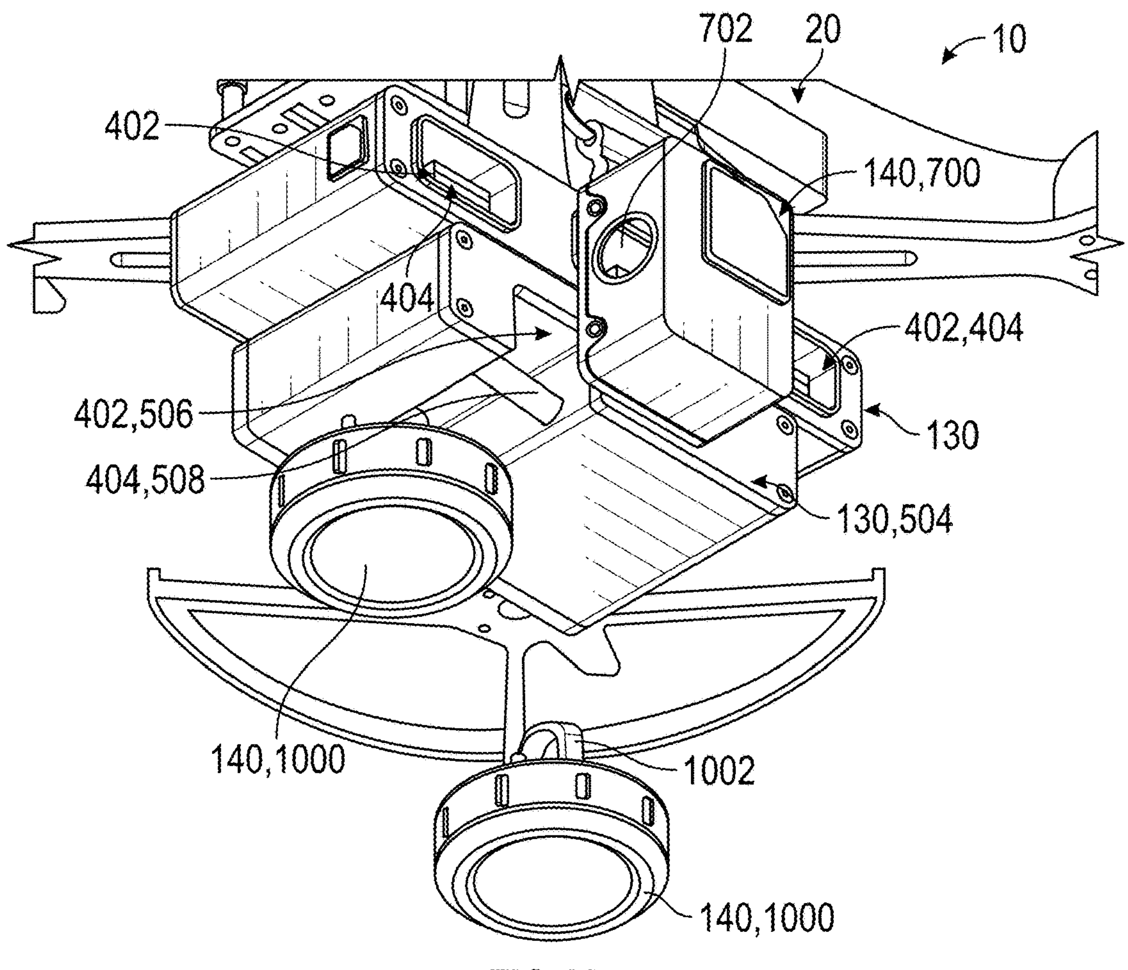
FIG. 10 illustrates the modular system deploying an explosive payload.

In at least one example, as illustrated in FIG. 5, the modular component 130 can include the actuators 402 with receiving portions 404 operable to receive interchangeable payloads 140, for example as illustrated in FIGS. 6A, 7A, 8, 9, 10. In at least one example, the modular component 130 can include an exchangeable unit 502, such as a battery, which can be coupled with the modular component 130 and/or the control component 120 (e.g., via interface 503) to provide additional power. In at least one example, the modular component 130 can include an additional modular component 504 that can be coupled with the modular component 130, the battery 502, and/or the control component 120 (e.g., via interface 503). The modular component 130, 504 can include an actuator 402, 506 which can be operable to receive and control the payload 140. For example, as illustrated in FIG. 10, the actuator 402, 506 of the additional modular component 504 includes a receiving portion 404, 508 which can detachably connect to and control (e.g., deploy, send signals, etc.) the payload 140. As illustrated in FIG. 10, the payload 1000 can include a latch 1002 which can be operable to couple with a bar receiving portion 508 of the modular component 504. When actuator 506 of the modular component 504 transitions to the deploy configuration, the payload 1000 can be detached from the modular component 504 and deployed. Accordingly, the additional modular component 130, 504 allows for additional modularity of the modular system 100 by being able to continually add and/or interchange functionalities and capabilities to the drone system 10.

Payloads 140 can be operable to expand the functionality of the drone system 10. For example, payloads 140 can include one or more of the following: explosive charge, ballistic payload, sensor, antenna, radio, camera, speaker, light emitter, and/or drone. In at least one example, the payloads 140 can be remotely controlled. In at least one example, the payloads 140 can be controlled via the modular system 100, for example via the control component 120 and/or the modular component 130.

FIGS. 6A-10 illustrate examples of payloads 140 that can be interchangeably used and/or coupled with the modular system 100 to extend the capabilities of the drone system 10. Payloads 140, for example, can include one or more functionalities such as flight, radio repeater, antenna, camera, light emittance, audio recording, audio playback, computing, wireless communication, data relay, seismic monitoring, and/or sensors. As shown in FIGS. 6A-9, the payload 140 can include a connector interface 142 that is operable to couple with the receiving portion 404 of the modular component 130. In at least one example, the payload 140 can be operable to provide tactile feedback when coupled with the receiving portion 404 of the modular component 130. Accordingly, the user can easily know when the payload 140 is adequately and desirably coupled with the modular component 130. In some examples, each payload 140 can include a mechanical lock 144 to prevent undesired disengagement when coupled with the modular component 130.

Figure 6A:
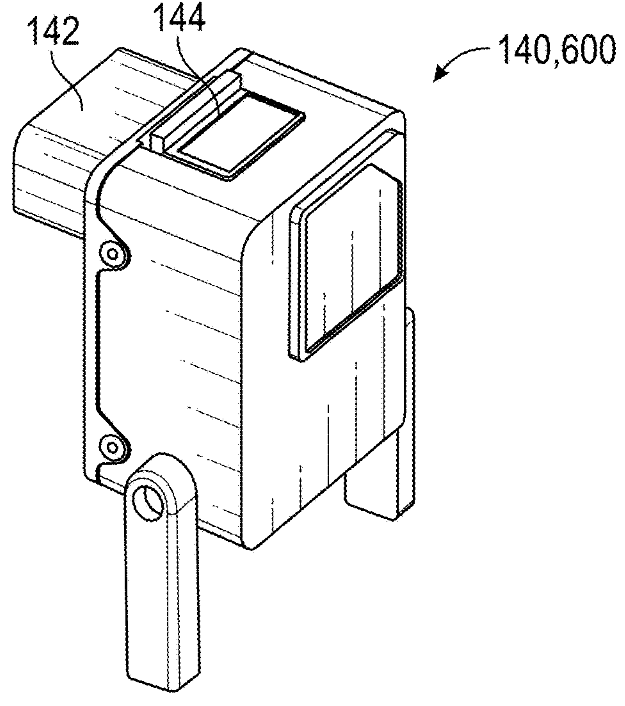
FIG. 6A illustrates a connection payload.
Figures 6B, 7A:
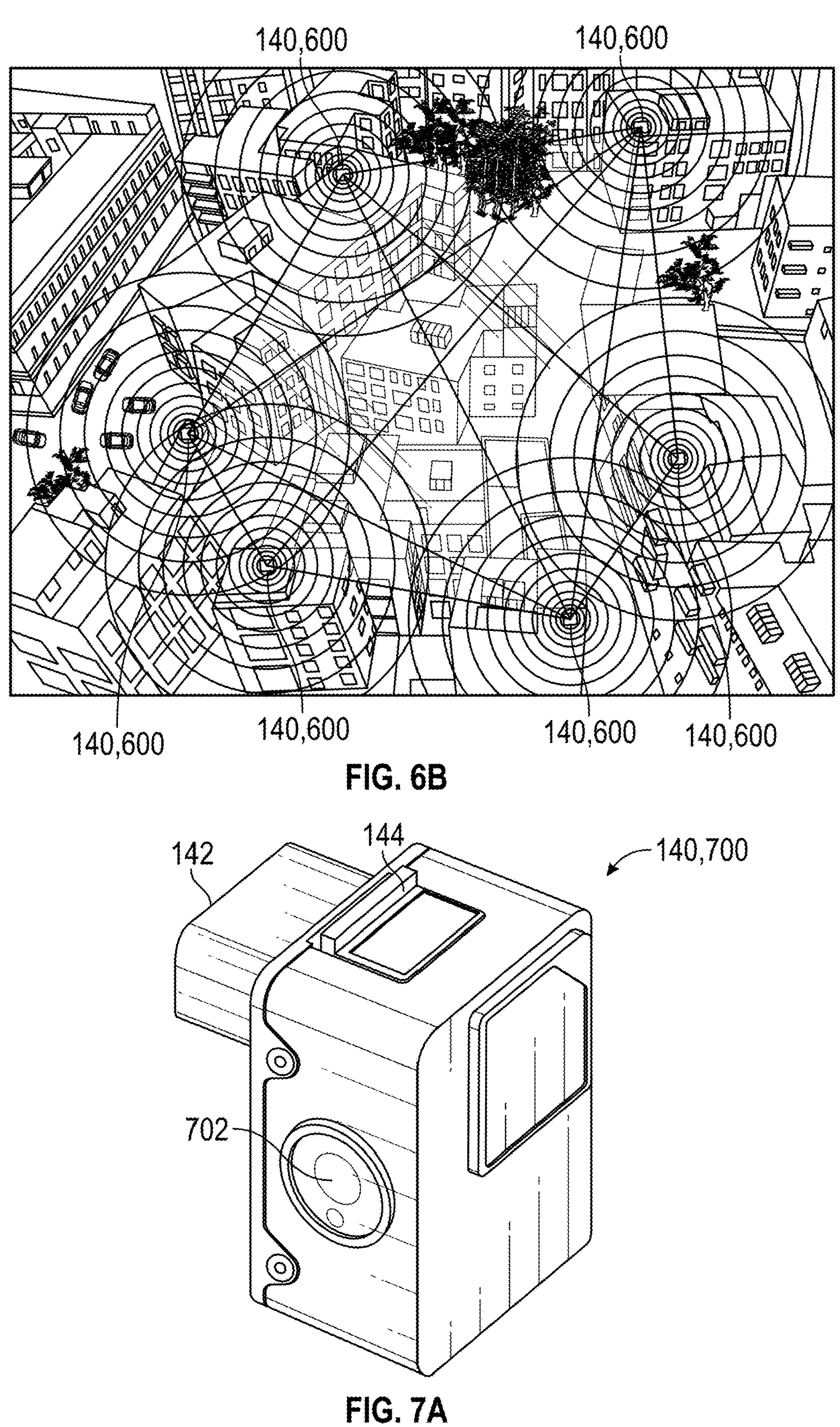
FIG. 6B illustrates the connection payload establishing a data network.
FIG. 7A illustrates a camera payload.
Figure 7B:
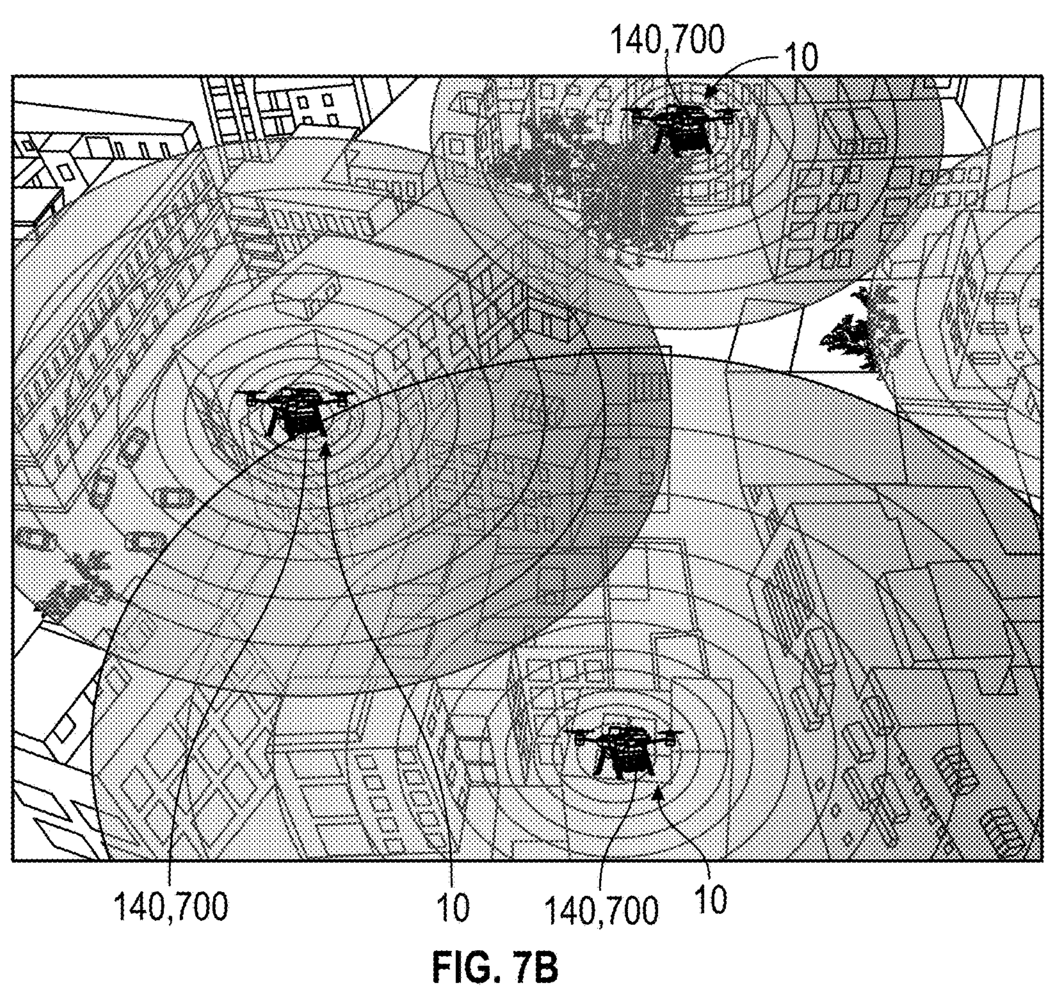
FIG. 7B illustrates the modular system establishing communication network.

FIG. 6A illustrates a payload 140, 600 that includes an antenna and/or a radio functionality. As shown in FIG. 6B, the antenna 600 can establish wireless communications and/or be deployed to maximize signal propagation aiding uninterrupted communication. FIG. 7A illustrates a payload 700 that includes a camera 702 that can identify ideal placement, as illustrated in FIG. 7B, to ensure adequate coverage. FIG. 8 illustrates a payload 800 that includes a light emitter 802 which can be operable to emit light. For example, the payload 800 can be remotely activated to deter and disorient. FIG. 9 illustrates a payload 900 that includes a speaker 902 which can emit sound. In some examples, the speaker 902 can record sound. In some examples, the payload 900 can be operable to record and/or playback sounds to cause deterrent audio and/or provide instructions. As illustrated in FIG. 10, a plurality of payloads 140 can be interchanged and included together to function as a unit with the modular system 100 to improve and increase the capabilities of the drone system 10. In at least one example, the modular components 130 that correspond with the desired payloads 140 can also be interchanged in the modular system 100 to provide for the ability to receive and/or control the desired payloads 140.

Figure 11A:
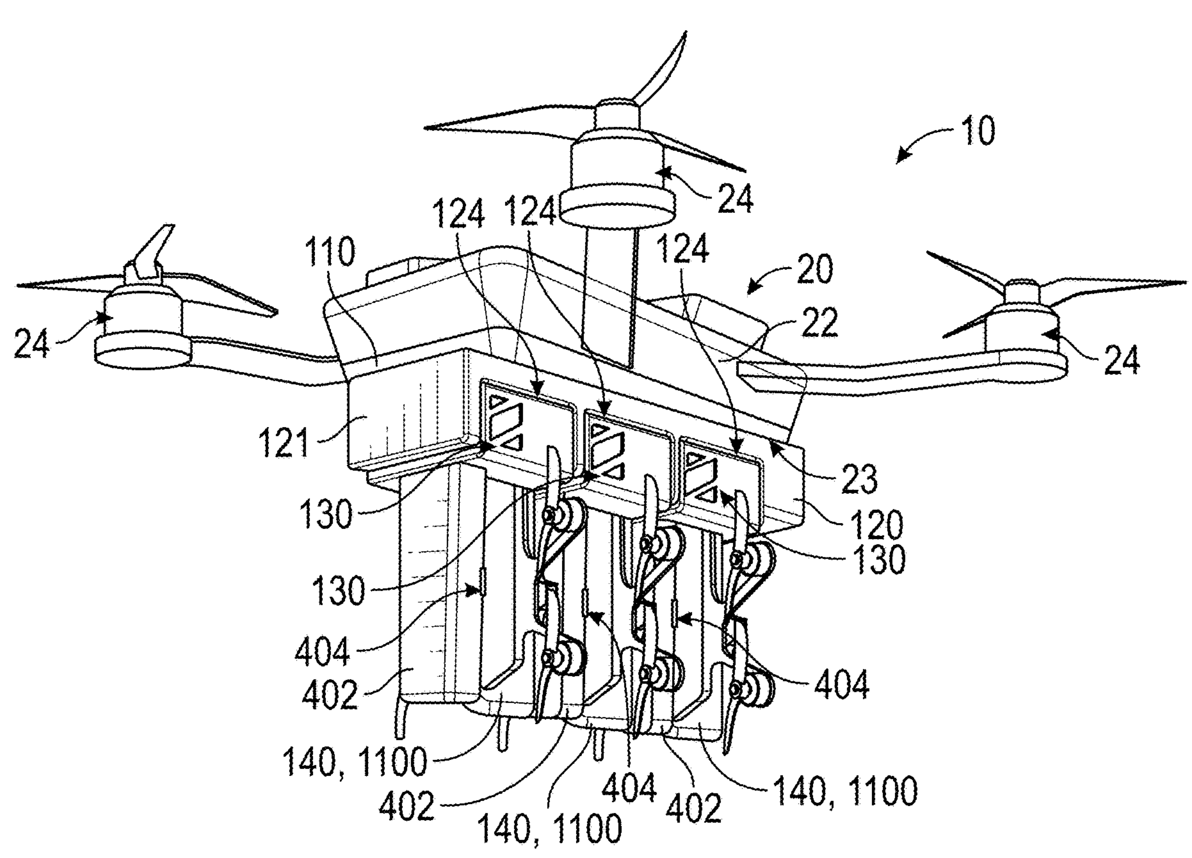
FIG. 11A illustrates the modular system including a plurality of drone payloads.
Figure 11B:
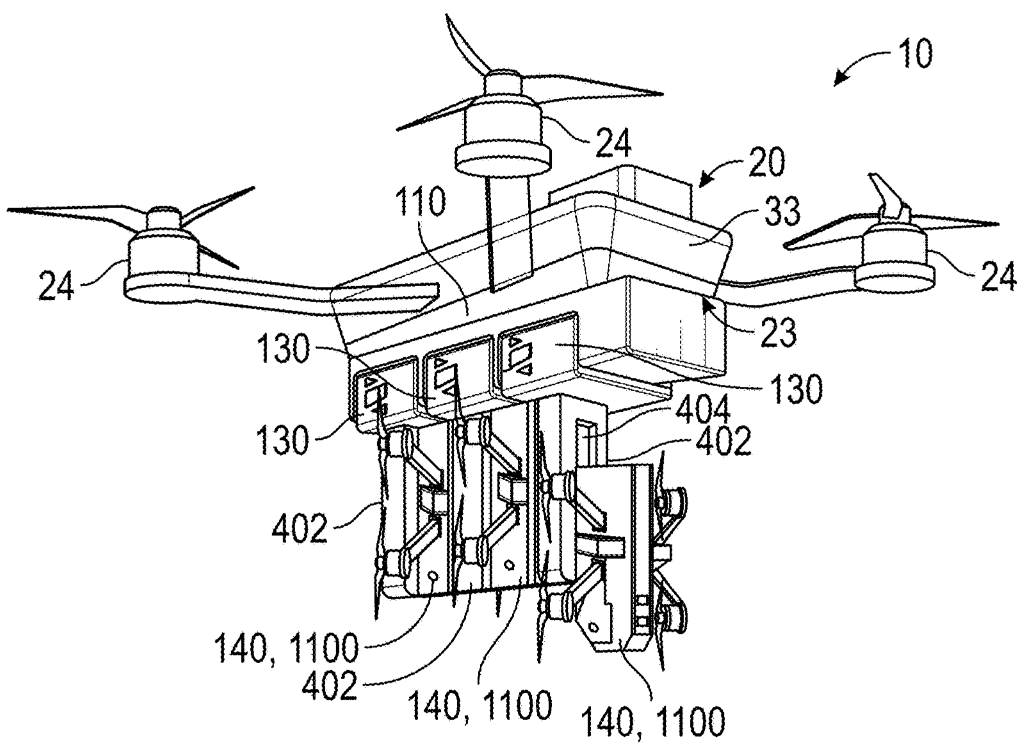
FIG. 11B illustrates the modular system deploying a drone payload.
Figure 11C:
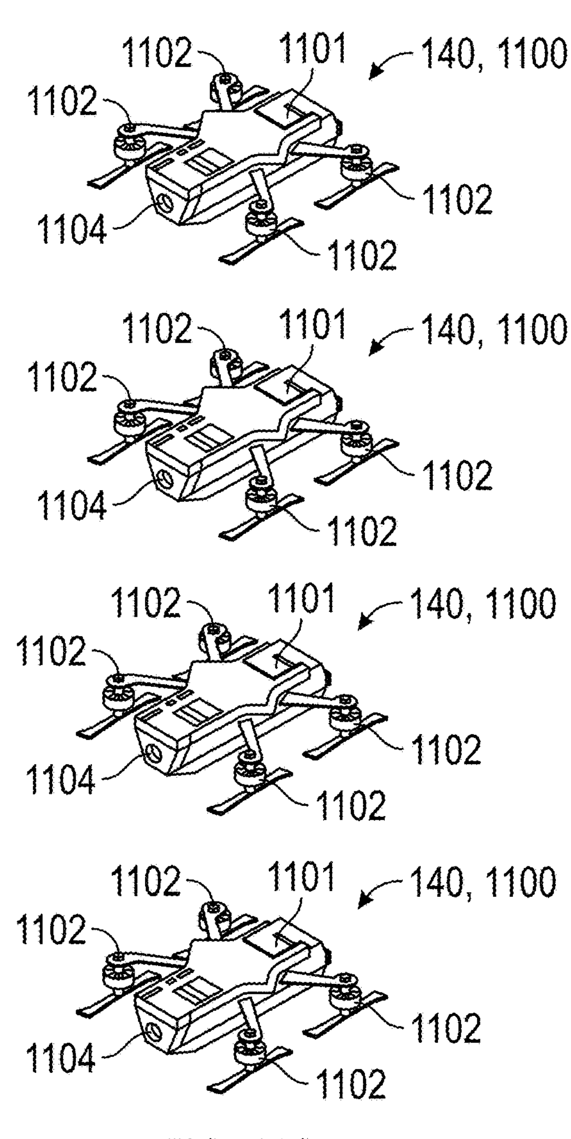
FIG. 11C illustrates a plurality of drone payloads that have been deployed.

FIGS. 11A-11C illustrate a drone system 10 with a modular system 100 that includes a plurality of modular components 130 that are operable to couple with and control drone payloads 140, 1100. As shown in FIG. 11A, the drone payloads 1100 are coupled with the modular components 130. As shown in FIG. 11B, one of the modular components 130 has received a signal to activate the corresponding drone payload 1100 and detach the drone payload 1100. FIG. 11C illustrates the drone payloads 1100. As shown in FIG. 11C, the drone payloads 1100 can include a body 1101, one or more propellers 1102, and, in some examples, one or more sensors 1104, such as a camera, speaker, light emitter, etc.

Figure 12A:
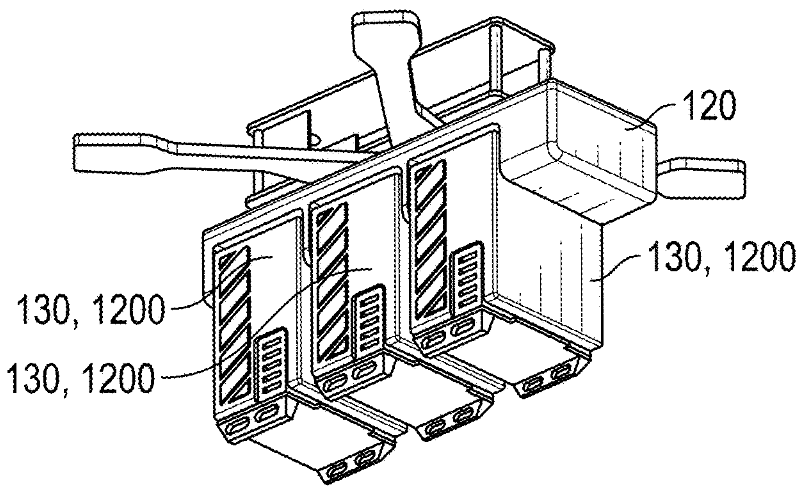
FIG. 12A illustrates the modular system including a plurality of dropper modular components.
Figure 12B:
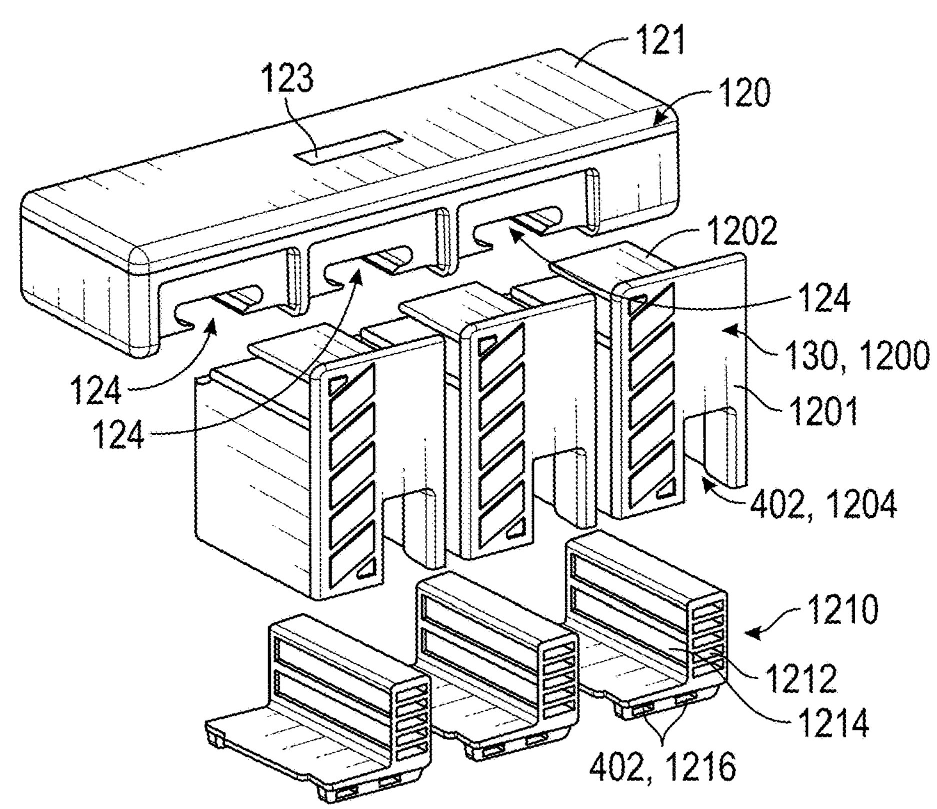
FIG. 12B illustrates an exploded view of the dropper modular components.

FIGS. 12A-12D illustrate a modular system 100 that includes a plurality of modular components 130, 1200 that are operable to receive and deploy (e.g., drop) payloads 140. The modular components 1200 as illustrated in FIGS. 12A-12B can be operable to deploy a variety of types of payloads 140 with different coupling mechanisms. As shown in FIG. 12B, the control component 120 can include the interface 123 operable to couple (electronically and/or physically) with the chassis 110. The control component 120, as illustrated in FIG. 12B, can include a plurality of module receivers 124 operable to couple with the modular components 130. Different modular components 130 can have different functionalities and shapes, but the coupling components 1202 of the different modular components 130 can be configured to couple with and correspond with the module receivers 124 to provide interchangeability between modular components 130. Accordingly, the coupling components 1202 for the modular components 130 are all standardized to provide interchangeability.

As illustrated in FIG. 12B, the modular component 1200 can include a body 1201 that includes an actuator 402, 1204. The actuator 1204 can be operable to receive, couple with, and/or control the payload 140. In some examples, the actuator 1204 can be operable to receive and couple with a payload coupler 1210 which is operable to couple with a payload 140. Accordingly, the modular component 1200 can have different configurations and the ability to be modified to couple with a variety of different payloads 140.

Figure 12C:
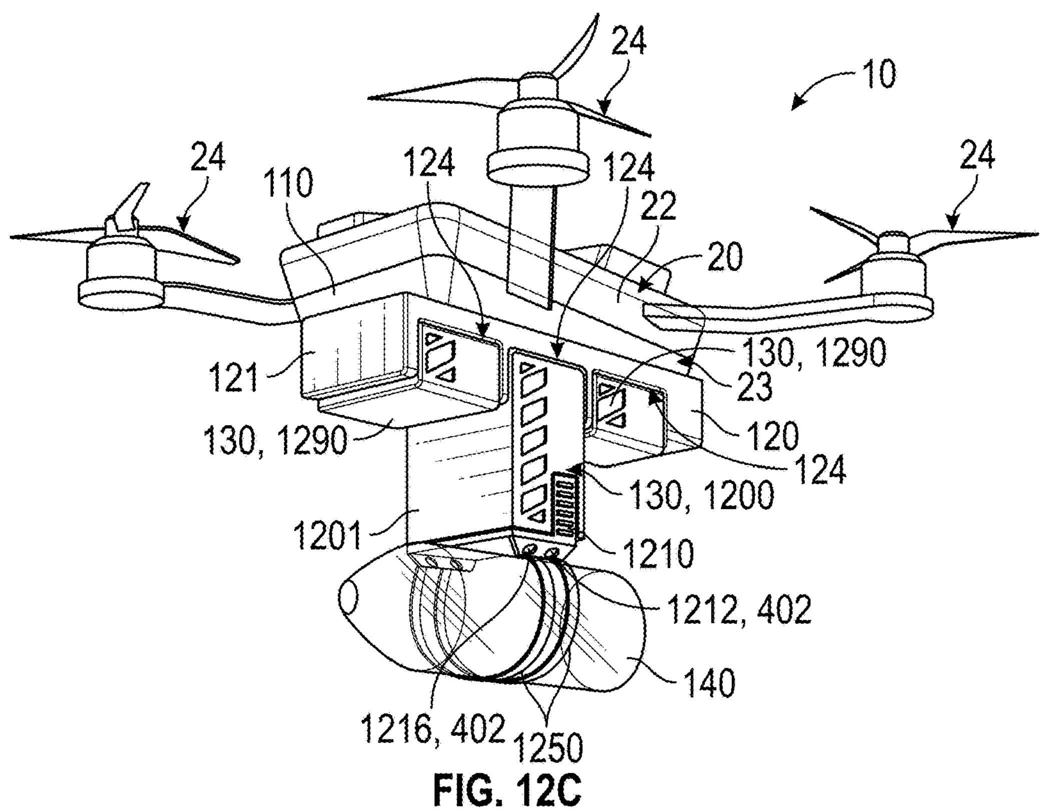
FIG. 12C illustrates the modular system including a dropper modular component coupled with an explosive payload.

In at least one example, the payload coupler 1210 can include a body 1212 with a coupling mechanism 1214 that is operable to couple with the actuator 1204. The payload coupler 1210 can include one or more actuators 402, 1216 operable to couple with the payload 140. For example, the actuator 1216 can include a plurality of apertures which, as shown in FIG. 12C, one or more ties 1250 can be used to couple the payload 140 with the payload coupler 1210. The ties 1250 can include rope, string, zip tie, etc. to wrap around the payload 140 and be received through the actuator 1216 to couple the payload 140 with the payload coupler 1210.

Figure 12D:
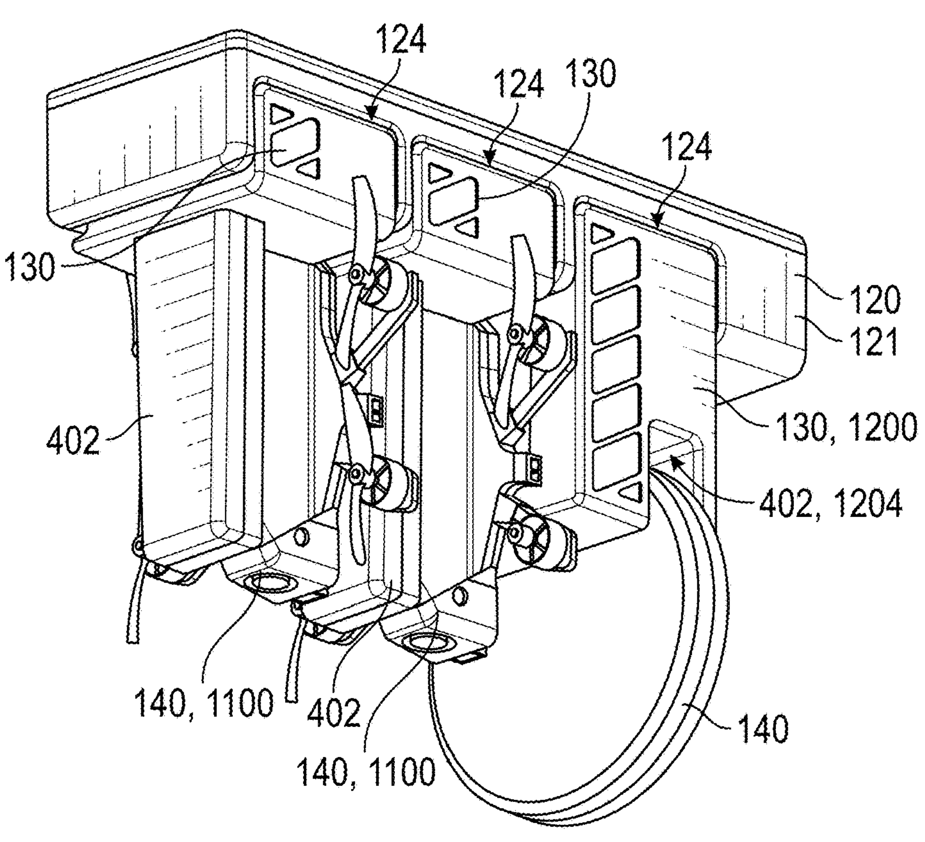
FIG. 12D illustrates the modular system including a dropper modular component with an explosive payload and a plurality of drone modular components with drone payloads.

FIG. 12D illustrates that the modular system 100 can include a plurality of interchangeable modular components 130 with different payloads 140. As shown in FIG. 12D, the modular system 100 can include two modular components 130 coupled with drone payloads 1100 and one modular component 130, 1200 coupled with a payload 140 such as a drop sensor, repeater, and/or munitions. The interchangeability of the modular components 130 to provide different payloads 140 increases the functionality and capabilities of the drone system 10.

Figure 13:
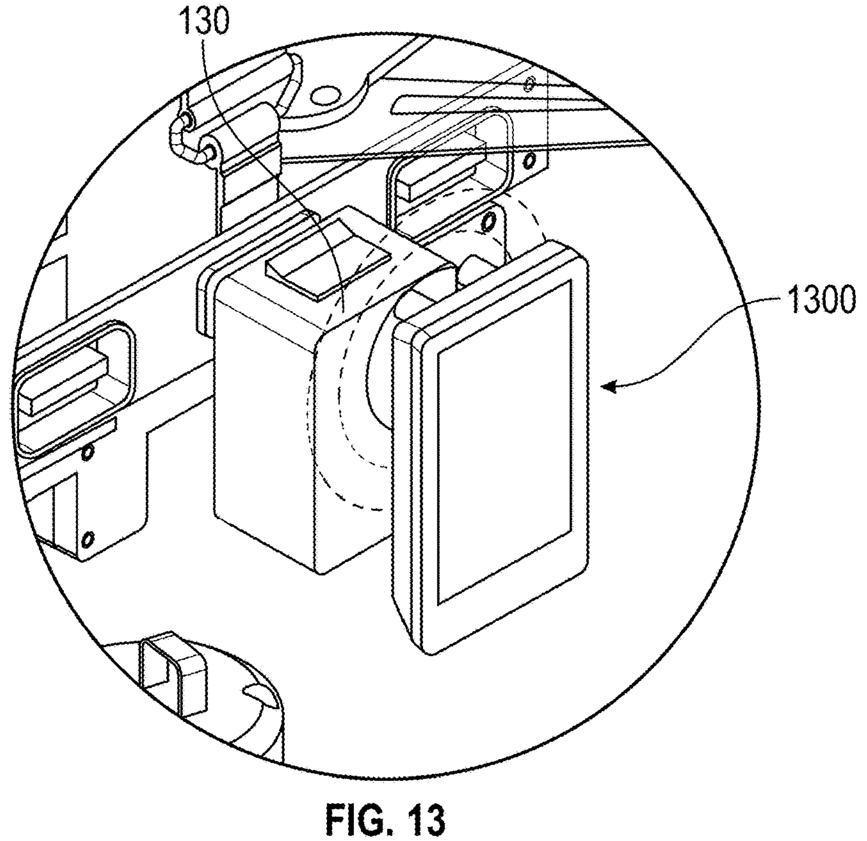
FIG. 13 illustrates a device communicating with the payload to set up the payload.

In at least one example, as illustrated in FIG. 13, each of the payloads 140 can include a tag operable to communicate with a controller 1300 (e.g., a tablet, a phone, a computer, etc.) such that the payload 140 is registered with the controller 1300 as it is being coupled with the modular component 130. In at least one example, the payload 140 can be registered wirelessly. In at least one example, the tag can include an RFID tag, a QR code, etc. A user may need to swiftly configure the drone system 10 for various tasks and missions. By being able to quickly and easily register the payload 140, the modular system 100 is quickly and easily set up for precise and secure control and/or tracking of the different capabilities now offered by the drone system 10.

Figure 14:
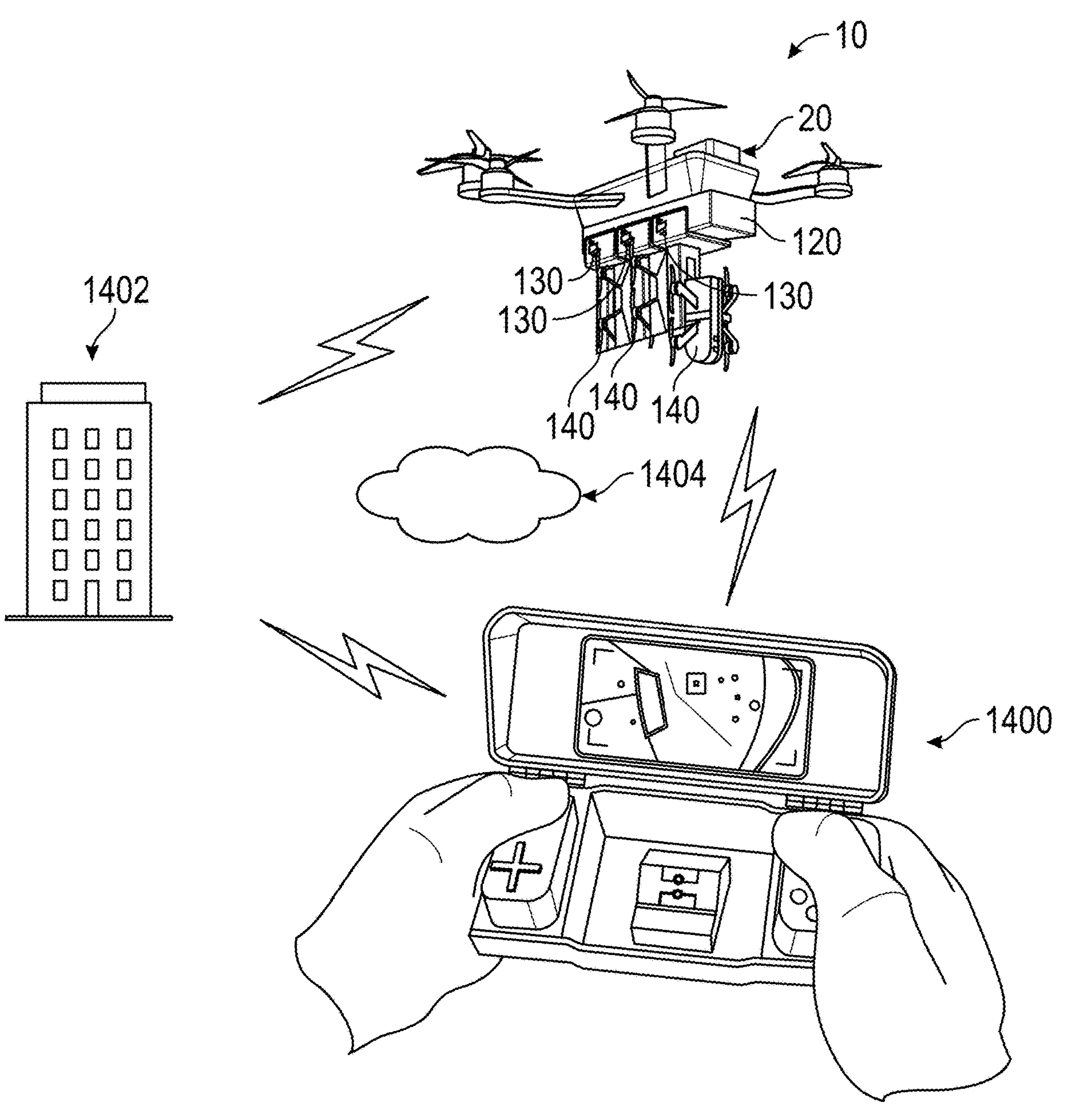
FIG. 14 illustrates a drone system communicatively coupled with a controller, a server, and a base control.

FIG. 14 illustrates that the drone system 10 and/or the modular system 100 can be communicatively coupled with a server 1404, a controller 1400, and/or a base control 1402. The controller 1400 and/or the base control 1402 can be operable to be in communication with the chassis 110, the control component 120, the modular components 130, the actuator 402, and/or the payload 140. The controller 1400 and/or the base control 1402 can be operable to control and/or receive data from the modular components 130 via the control component 120 (e.g., via the processor 1600). In at least one example, the controller 1400 and/or the base control 1402 can be operable to control the payload 140 and/or receive data from the payload 140. For example, the payload 140 may take pictures and/or detect signals (e.g., acoustic, light, etc.) and transmit the data to the controller 1400 and/or the base control 1402. In at least one example, the controller 1400 and/or the base control 1402 can be operable to control the payload 140 (e.g., remotely) to explode and/or propel the ballistics after being deployed. In some examples, the controller 1400 and/or the base control 1402 can be operable to control the flight and/or function(s) of the drone 20 and/or receive data from the drone 20.

Accordingly, the modular system 100 can be remotely controlled by an operator and/or a team to synchronize and utilize the payloads 140.

Figure 15:
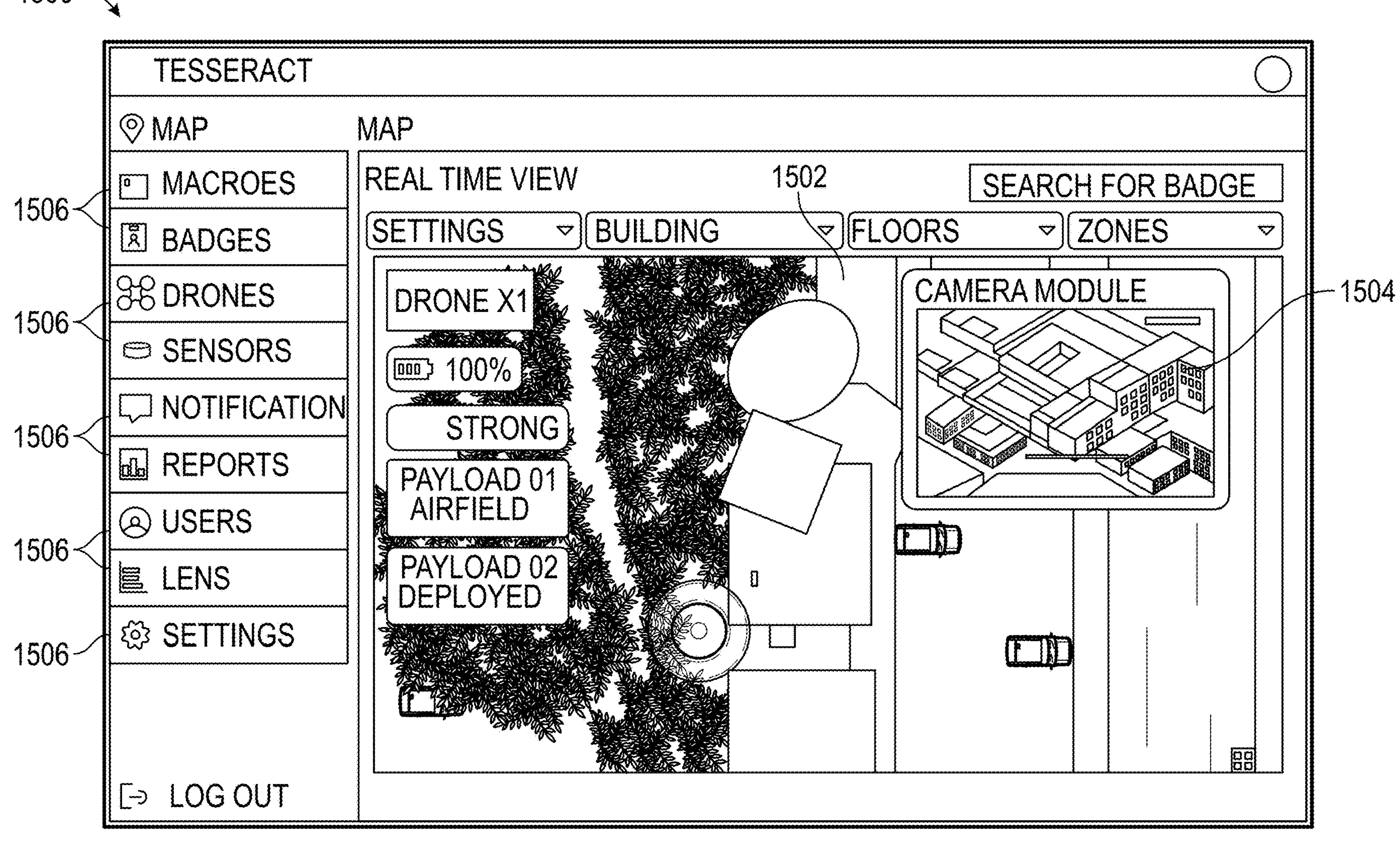
FIG. 15 illustrates a user interface for tracking and controlling the drone systems and corresponding payloads.

FIG. 15 illustrates an example user interface 1500 of the controller 1400 and/or the base control 1402. The user interface 1500 can include, for example, a map 1502, which can show the environment and/or the location of operators, the team, the payloads 140 and/or the drone systems 10. In some examples, the user interface 1500 can show the visuals 1504 from camera payload(s) 140, drone payload(s) 140, and/or the drone(s) 20. In some examples, the user interface 1500 can include additional settings 1506 which can provide different capabilities. For example, various sensors and data sources can collect real-time data which can be compiled, analyzed, and/or shown in the user interface 1500. In some examples, the modular system 100 can be operable to operate in real-time, facilitating immediate sharing of information via the user interface 1500. With this data, operators can analyze the data to make quick and informed decisions. In some examples, different entities can collaborate, allowing for coordinated responses to events.

FIG. 16 is a block diagram of an exemplary processor 1600. Processor 1600 is configured to perform processing of data and communicate with the sensors, for example as illustrated in FIGS. 1A-15. In operation, processor 1600 communicates with one or more of the components discussed herein and may also be configured to communication with remote devices/systems.

As shown, processor 1600 includes hardware and software components such as network interfaces 1610, at least one processor 1620, sensors 1660 and a memory 1640 interconnected by a system bus 1650. Network interface(s) 1610 can include mechanical, electrical, and signaling circuitry for communicating data over communication links, which may include wired or wireless communication links. Network interfaces 1610 are configured to transmit and/or receive data using a variety of different communication protocols, as will be understood by those skilled in the art.

Processor 1620 represents a digital signal processor (e.g., a microprocessor, a microcontroller, or a fixed-logic processor, etc.) configured to execute instructions or logic to perform tasks in a wellbore environment. Processor 1620 may include a general purpose processor, special-purpose processor (where software instructions are incorporated into the processor), a state machine, application specific integrated circuit (ASIC), a programmable gate array (PGA) including a field PGA, an individual component, a distributed group of processors, and the like. Processor 1620 typically operates in conjunction with shared or dedicated hardware, including but not limited to, hardware capable of executing software and hardware. For example, processor 1620 may include elements or logic adapted to execute software programs and manipulate data structures 1645, which may reside in memory 1640.

Sensors 1660 typically operate in conjunction with processor 1620 to perform measurements, and can include special-purpose processors, detectors, transmitters, receivers, and the like. In this fashion, sensors 1660 may include hardware/software for generating, transmitting, receiving, detection, logging, and/or sampling magnetic fields, seismic activity, and/or acoustic waves, or other parameters.

Memory 1640 comprises a plurality of storage locations that are addressable by processor 1620 for storing software programs and data structures 1645 associated with the embodiments described herein. An operating system 1642, portions of which may be typically resident in memory 1640 and executed by processor 1620, functionally organizes the device by, inter alia, invoking operations in support of software processes and/or services 1644 executing on processor 1600. These software processes and/or services 1644 may perform processing of data and communication with processor 1600, as described herein. Note that while process/service 1644 is shown in centralized memory 1640, some examples provide for these processes/services to be operated in a distributed computing network.

It will be apparent to those skilled in the art that other processor and memory types, including various computer-readable media, may be used to store and execute program instructions pertaining to the fluidic channel evaluation techniques described herein. Also, while the description illustrates various processes, it is expressly contemplated that various processes may be embodied as modules having portions of the process/service 1644 encoded thereon. In this fashion, the program modules may be encoded in one or more tangible computer readable storage media for execution, such as with fixed logic or programmable logic (e.g., software/computer instructions executed by a processor, and any processor may be a programmable processor, programmable digital logic such as field programmable gate arrays or an ASIC that comprises fixed digital logic. In general, any process logic may be embodied in processor 1620 or computer readable medium encoded with instructions for execution by processor 1620 that, when executed by the processor, are operable to cause the processor to perform the functions described herein.

The disclosures shown and described herein are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described herein may be modified within the scope of the appended claims.

The invention claimed is:

1. A modular system for drones, the modular system comprising:

a chassis including a coupling mechanism operable to removably couple the chassis with a drone, wherein the chassis is configured to be positioned underneath the drone and to extend below a lower surface of the drone when installed;

a control component;

a plurality of modular components operable to be interchangeably coupled with the control component, the plurality of modular components operable to be detachably coupled with a payload;

wherein each of the plurality of modular components includes one or more actuators operable to receive and control the payload;

wherein the one or more actuators extends vertically downward from a base of the modular component, wherein the actuator is operable to restrict horizontal movement of the payload received therein such that the payload deploys vertically downward.

2. The modular system of claim 1, wherein the control component is operable to be detachably coupled with the chassis.

3. The modular system of claim 1, wherein the control component is operable to provide connectivity, power, and/or control of each of the plurality of modular components.

4. The modular system of claim 1, wherein the one or more actuators includes one or more receiving portions operable to detachably couple with the payload.

5. The modular system of claim 1, wherein the payload includes one or more of the following: explosive charge, ballistic payload, sensor, antenna, radio, camera, speaker, light emitter, and/or drone.

6. The modular system of claim 1, further comprising a controller operable to be in communication with the chassis, the control component, the plurality of modular components, an actuator, and/or a payload.

7. The modular system of claim 6, wherein the controller is operable to control and/or receive data from the plurality of modular components via the control component.

8. The modular system of claim 6, wherein the controller is operable to control the payload and/or receive data from the payload.

9. The modular system of claim 6, wherein the controller is operable to control the payload to explode and/or propel the ballistics after being deployed.

10. The modular system of claim 6, wherein the controller is operable to control the flight and/or function(s) of the drone and/or receive data from the drone.

11. A drone system comprising:

a drone;

a modular system coupled with the drone, the modular system including:

a chassis including a coupling mechanism operable to removably couple the chassis with the drone, wherein the chassis is configured to be positioned underneath the drone and to extend below a lower surface of the drone when installed;

a control component;

a plurality of modular components operable to be interchangeably coupled with the control component, the plurality of modular components operable to be detachably coupled with a payload;

wherein each of the plurality of modular components includes one or more actuators operable to receive and control the payload;

wherein the one or more actuators extends vertically downward from a base of the modular component, wherein the actuator is operable to restrict horizontal movement of the payload received therein such that the payload deploys vertically downward.

12. The drone system of claim 11, wherein the control component is operable to provide connectivity, power, and/or control of each of the plurality of modular components.

13. The drone system of claim 11, wherein the actuator includes one or more receiving portions operable to detachably couple with the payload.

14. The drone system of claim 11, wherein the payload includes one or more of the following: explosive charge, ballistic payload, sensor, antenna, radio, camera, speaker, light emitter, and/or drone.

15. The drone system of claim 11, wherein the chassis of the modular system is configured to be retrofit to couple with the drone.

16. The drone system of claim 11, further comprising a controller operable to be in communication with the chassis, the control component, the plurality of modular components, an actuator, and/or a payload.

17. The drone system of claim 16, wherein the controller is operable to control and/or receive data from the plurality of modular components via the control component.

* * * * *